United States Patent
Chung

(10) Patent No.: US 7,899,121 B2
(45) Date of Patent: Mar. 1, 2011

(54) VIDEO ENCODING METHOD, VIDEO ENCODER, AND PERSONAL VIDEO RECORDER

(75) Inventor: Tae Il Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 1409 days.

(21) Appl. No.: 11/358,031

(22) Filed: Feb. 22, 2006

(65) Prior Publication Data
US 2006/0190625 A1    Aug. 24, 2006

(30) Foreign Application Priority Data
Feb. 22, 2005    (KR) ............... 10-2005-0014458

(51) Int. Cl.
  H04B 1/66    (2006.01)
  H04N 7/12    (2006.01)
  H04N 11/02   (2006.01)
(52) U.S. Cl. .................. 375/240.16; 375/240.18; 375/240.23
(58) Field of Classification Search ........... 375/240.12, 375/240.13, 240.15, 240.16, 240.18, 240.23
See application file for complete search history.

(56) References Cited
U.S. PATENT DOCUMENTS

2005/0147173 A1* 7/2005 Winger et al. ......... 375/240.23
2005/0229231 A1* 10/2005 Lippincott .............. 725/131
2006/0291563 A1* 12/2006 Park et al. ............. 375/240.17
2007/0047648 A1* 3/2007 Tourapis et al. ........ 375/240.13
2007/0071096 A1* 3/2007 Chen et al. ............. 375/240.12

* cited by examiner

Primary Examiner—Don N Vo
(74) Attorney, Agent, or Firm—Birch, Stewart, Kolasch & Birch, LLP

(57) ABSTRACT

A video encoding method, a video encoder, and a Personal Video Recorder (PVR) are disclosed. The PVR includes: a first video decoder for decoding an input MPEG-2 video signal, calculating reference picture information of the MPEG-2 video signal and a motion vector of a reference picture, and outputting the calculated result; a first video encoder for encoding the decoded MPEG-2 video signal into a H.264 video signal using the motion vector and the reference picture information generated from the first video decoder; and a storage unit for storing the H.264 video signal generated from the first video encoder. Therefore, the PVR can effectively transcode the MPEG-2 format image into the H.264 format image, can display a desired image or video signal without deterioration of an image quality, and can quickly transform a compression format of the image into another format.

19 Claims, 6 Drawing Sheets

VIDEO ENCODING METHOD, VIDEO ENCODER, AND PERSONAL VIDEO RECORDER

This application claims the benefit of Korean Patent Application No. 10-2005-0014458, filed on Feb. 22, 2005, which is hereby incorporated by reference as if fully set forth herein.

BACKGROUND OF THE INVENTION

1. Field of the Invention

The present invention relates to a video encoding method, a video encoder, and a Personal Video Recorder (PVR), and more particularly to a video encoding method and a video encoder which can effectively perform the conversion of the video encoding, and a Personal Video Recorder (PVR) capable of effectively displaying video signals.

2. Discussion of the Related Art

Recently, a variety of Personal Video Recorders (PVRs) capable of storing/reproducing digital broadcast streams have been developed and introduced to the market.

The PVR generally indicates all the hardware capable of storing digital video data, and includes a set-top box, a digital television set and so on.

The PVR stores a stream encoded with a Moving Picture Experts Group 2 (MPEG-2) format in a memory unit, and then reproduces the stored stream at a user-desired time. If required, some PVRs may encode an analog video signal according to an MPEG-2 format, and may store the encoded video signal in a memory unit.

FIG. 1 is a block diagram illustrating a conventional PVR.

Referring to FIG. 1, the conventional PVR includes an MPEG-2 decoder 11, a storage unit 13, and a display processor 14. If the PVR can encode the analog video signal, it can further include an MPEG-2 encoder 12.

The MPEG-2 decoder 11 decodes a received digital video signal, and outputs the decoded video signal. The display processor 14 can display the decoded video signal on a display screen. The decoded video signal is stored in the storage unit 13, and is then reproduced on the screen when a user desires to view the video signal.

If the MPEG-2 encoder 12 receives an analog video signal, it encodes the received analog video signal into a video signal of an MPEG-2 format, and stores the encoded video signal in the storage unit 13.

An MP@HL HD video image requires storage capacity of about 9 gigabytes to store an encoded MPEG-2 formatted bitstream of about 1 hour. An MP@HL SD video image requires storage capacity of about 2 gigabytes to store the encoded MPEG-2 formatted bitstream of about 1 hour.

Therefore, the conventional PVR has widely used a video encoder due to the increased production costs caused by the storage unit 13. In this case, the video encoder reduces a bit rate of the stored bitstream in consideration of the increased production costs caused by the storage unit 13, and performs a video-transcoding operation on the resultant bitstream.

The video encoder converts a compressed format of the decoded video signal using motion information and decoding-associated information into another format, and adjusts the scale of the motion information. The video encoder encodes the received video signal in the form of an MPEG-2 bitstream using the adjusted motion information, and creates an MPEG-2 formatted video signal having a low bit rate.

However, the above-mentioned video encoding apparatus and method for re-encoding the MPEG-2 format image using only the motion information of the adjusted scale, have disadvantages in that it may result inconsistent format of received image or deterioration of an image quality.

In the meantime, the H.264 (MPEG-4 Part 10/AVC) format is superior to the MPEG-2 format in light of compression rate- and image quality-aspects. Therefore, in order to reduce the image-quality deterioration encountered by the encoding of the MPEG-2 format image, an apparatus or method for transcoding the MPEG-2 format image into the H.264 format image has been developed.

However, the H.264 format image generally requires a large number of encoding calculations, which is higher than in the MPEG-2 format image by about 10 times, and also requires a large number of decoding calculations, which is higher than in the MPEG-2 format image by about 3 times, such that hardware performance for the H.264 format image must be superior to that of the MPEG-2 format image.

Therefore, provided that the PVR includes an encoder, which decodes the MPEG-2 format image using the MPEG-3 decoder and re-encodes the decoded image according to the H-264 format, it can prevent the image-quality deterioration from being generated, but it has a disadvantage that it requires a large number of calculations, a long calculation time, and a large amount of storage capacity.

SUMMARY OF THE INVENTION

Accordingly, the present invention is directed to a video encoding method, a video encoder, and a personal video recorder (PVR) that substantially obviate one or more problems due to limitations and disadvantages of the related art.

An object of the present invention is to provide a video encoder capable of effectively transcoding the MPEG-2 format image into the H.264 format image, and an encoding method for the video encoder.

Another object of the present invention is to provide a PVR capable of displaying an image or video signal without deterioration of an image quality, and quickly transforming a compressed format of the image into another format.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a video encoding method comprising the steps of: decoding an MPEG-2 video signal; storing reference picture information of a reference picture acquired from the MPEG-2 video signal and a motion vector of a macroblock associated with the reference picture; and encoding the decoded MPEG-2 video signal into an H.264 video signal using the stored reference picture information and the stored motion vector.

Preferably, the reference picture information includes a picture number allocated to the reference picture.

Preferably, if the decoded MPEG-2 video signal is a video signal associated with an Intra-picture, a Predictive-picture, or Bi-directional picture, the encoded H.264 video signal is a video signal associated with the I-picture, the P-picture, or the B-picture, respectively.

Preferably, if the decoded MPEG-2 video signal is a video signal associated with a P-picture or a B-picture, an additional motion vector associated with the motion vector is calculated by using peripheral pixels of a pixel from which the motion vector is calculated, and is encoded into the H.264 video signal using the additional motion vector.

Preferably, the reference picture information in the encoding step is encoded into a slice header of the H.264 format.

In another aspect of the present invention, there is provided a video encoder comprising: a prediction unit for performing motion compensation of an input MPEG-2 video signal using reference picture information of a decoded MPEG-2 video signal and a motion vector of the reference picture, and outputting the motion-compensated video signal; a transform unit for transforming the motion-compensated video signal received from the prediction unit using an orthogonal-basis function, and quantizing the transform-resultant value; and an entropy coding unit for entropy-coding a video signal received from the transform unit.

Preferably, the prediction unit outputs the MPEG-2 video signal associated an I-picture, a P-picture, or a B-picture into a H.264 video signal associated with an I-picture, a P-picture, or a B-picture.

Preferably, the prediction unit includes: a motion information storage unit for storing the reference picture information and the motion vector of the reference picture; and a motion compensation unit for performing motion compensation of the MPEG-2 video signal using the reference picture information and the motion vector.

Preferably, the prediction unit further includes: an additional motion estimation unit for calculating an additional motion vector associated with the motion vector using peripheral pixels of a pixel from which the motion vector is calculated.

Preferably, the motion compensation unit performs motion compensation when the input MPEG-2 video signal is a video signal associated with a P-picture or a B-picture.

Preferably, the motion compensation unit performs motion compensation using the additional motion vector when the input MPEG-2 video signal is a video signal associated with a P- or B-picture.

Preferably, the motion information storage unit stores the reference picture to which a picture number is allocated.

Preferably, the prediction unit, if the input MPEG-2 video signal is a video signal associated with a P- or B-picture, transforms syntax of the video signal associated with the P- or B-picture into a H.264 format using the reference picture information, the motion vector of the reference picture, and an additional motion vector of the reference picture.

Preferably, the video signal associated with the P- or B-picture is indicative of a macroblock.

In another aspect of the present invention, there is provided a Personal Video Recorder (PVR) comprising: a first video decoder for decoding an input MPEG-2 video signal, calculating reference picture information of the MPEG-2 video signal and a motion vector of a reference picture, and outputting the calculated result; a first video encoder for encoding the decoded MPEG-2 video signal into a H.264 video signal using the motion vector and the reference picture information generated from the first video decoder; and a storage unit for storing the H.264 video signal generated from the first video encoder.

Preferably, the Personal Video recorder (PVR) further comprise: a display processor for allowing the video signal decoded by the first video decoder to be displayed on a screen.

Preferably, the Personal Video recorder (PVR) further comprise: a second video encoder for converting the received analog image into a digital image; and a second video decoder for decoding the H.264 video signal stored in the storage unit.

Preferably, the Personal Video recorder (PVR) further comprise: a display processor for allowing the video signal decoded by the second video decoder to be displayed on a screen.

In another aspect of the present invention, there is provided a video encoding method comprising the steps of: decoding a first video signal; storing reference picture information of a reference picture acquired from the first video signal and a motion vector of a macroblock associated with the reference picture; and encoding the decoded first video signal into a second video signal using the stored reference picture information and the stored motion vector.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
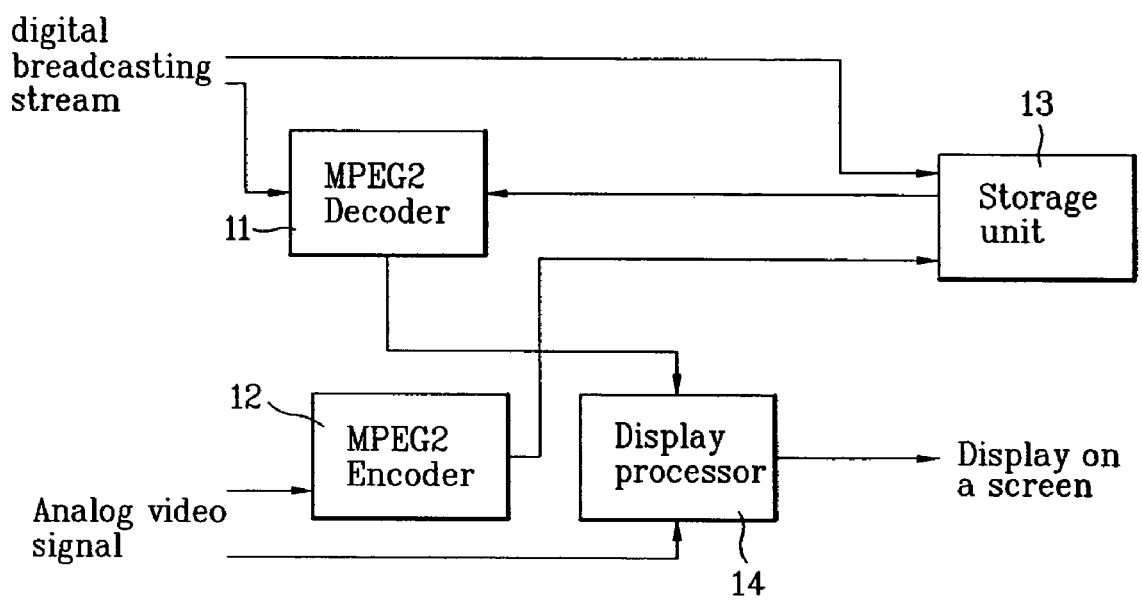
FIG. 1 is a block diagram illustrating a conventional PVR.
Figure 2:
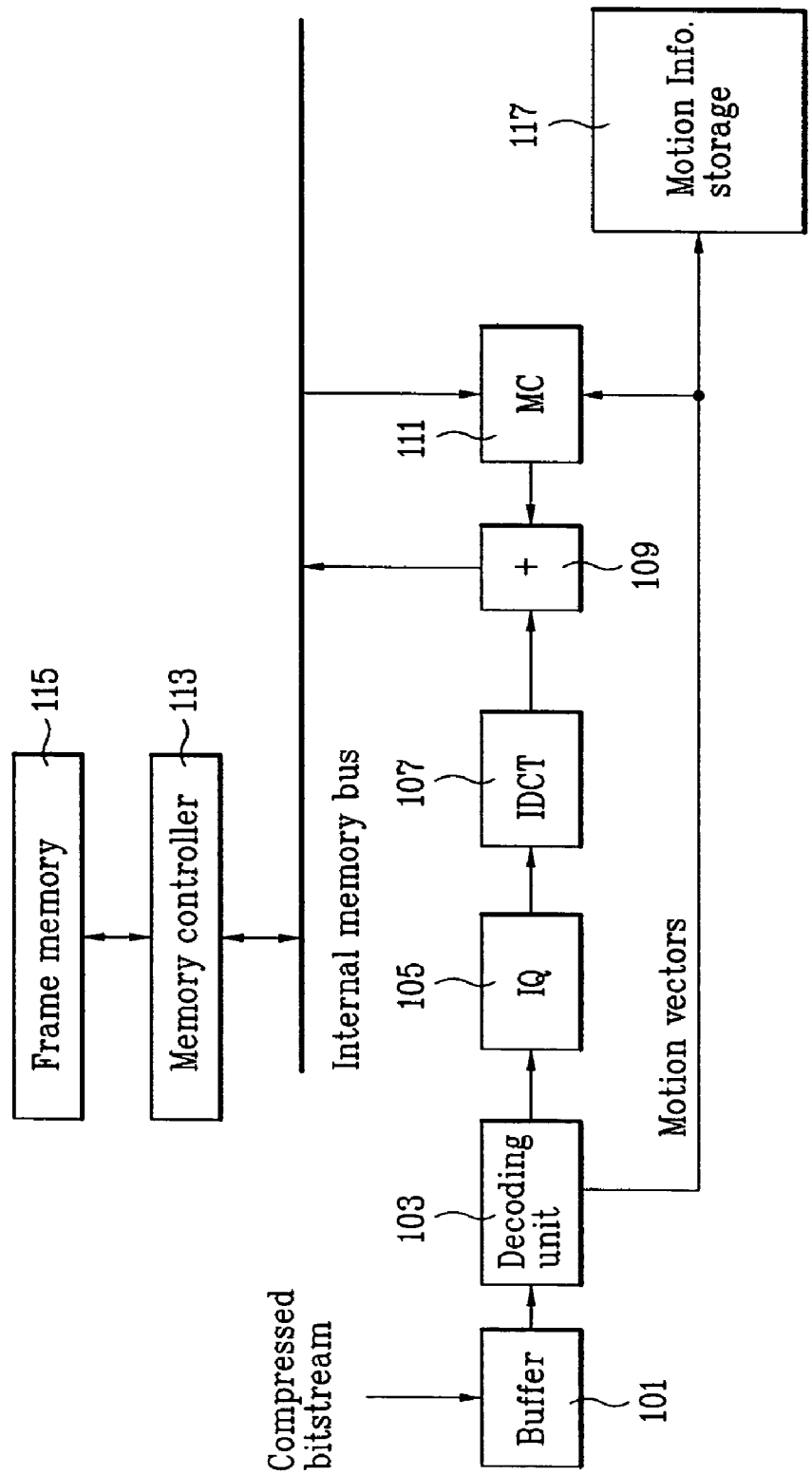
FIG. 2 is a block diagram illustrating a video decoder for use in a PVR according to the present invention.

FIG. 2 is a block diagram illustrating an embodiment of a video decoder for use in a PVR according to the present invention.

Referring to FIG. 2, the embodiment of the video decoder contained in the PVR according to the present invention sequentially includes a temporary memory unit 101, a decoding unit 103, an inverse quantization unit 105, an inverse transformation unit 107, an adder 109, and a motion compensation unit 111.

The above-mentioned video decoder further includes a memory controller 113 and a frame memory unit 115, which are connected to the motion compensation unit 111 via a bus.

Operations of the above-mentioned video decoder contained in the PVR according to the present invention will hereinafter be described with reference to FIG. 2.

The temporary memory unit 101 temporarily stores a compressed bitstream, and outputs the stored bitstream. The decoding unit 103 decodes a bitstream coded by a coding method, such as a variable length coding method, and divides the decoded bitstream into a motion vector, a quantization value, and a transformation coefficient.

The motion vector is transmitted to the motion compensation unit 111. The transformation coefficient serves as a Discrete Cosine Transform (DCT) coefficient if a DCT operation is executed during a bitstream compression process.

The inverse quantization unit 105 inversely quantizes the above-mentioned DCT coefficient according to a quantization value, and outputs the inversely-quantized DCT coefficient to the inverse transformation unit 107. The inverse transformation unit 107 performs an Inverse Discrete Cosine Transform (IDCT) process on the inversely-quantized DCT coefficient in macroblock units, and outputs the IDCT-processed DCT coefficient to the adder 109.

The motion compensation unit 111 performs motion compensation of a received frame pixel value using the motion vector and a previous frame stored in the frame memory unit 115, and outputs the motion-compensated value to the adder 109.

If a macroblock applied to the adder 109 is equal to a macroblock of an Intra-picture (I-picture), the adder 109 stores the IDCT result in the frame memory unit 115 via the memory controller 113.

Otherwise, if the macroblock applied to the adder 109 is equal to a Predictive-picture (P-picture) macroblock or a Bi-directional picture (B-picture) macroblock, the adder 109 stores the sum of the motion-compensated value and the IDCT resultant value in the frame memory unit 115.

The I-picture and the P-picture stored in the frame memory unit 115 may be used as reference images of the next input frames.

If a decoded image is determined to be a P-picture or a B-picture, the decoding unit 103 stores reference picture information for decoding the determined picture and a motion vector of each macroblock associated with the reference picture in the motion information storage unit 117.

If the reference picture information is stored in the motion information storage unit 117, it is preferable that a picture number of each picture is allocated to the reference picture information such that the resultant reference picture information equipped with the picture number may be stored in the motion information storage unit 117. The above-mentioned picture number may be available when the stored picture is found/read by a picture indexing operation. Information of the found picture may be contained in a slice header encoded with the H.264 standard.

Information stored in the motion information storage unit 117 may be used as data necessary for motion prediction when the image is encoded with the H.264 format.

Figure 3:
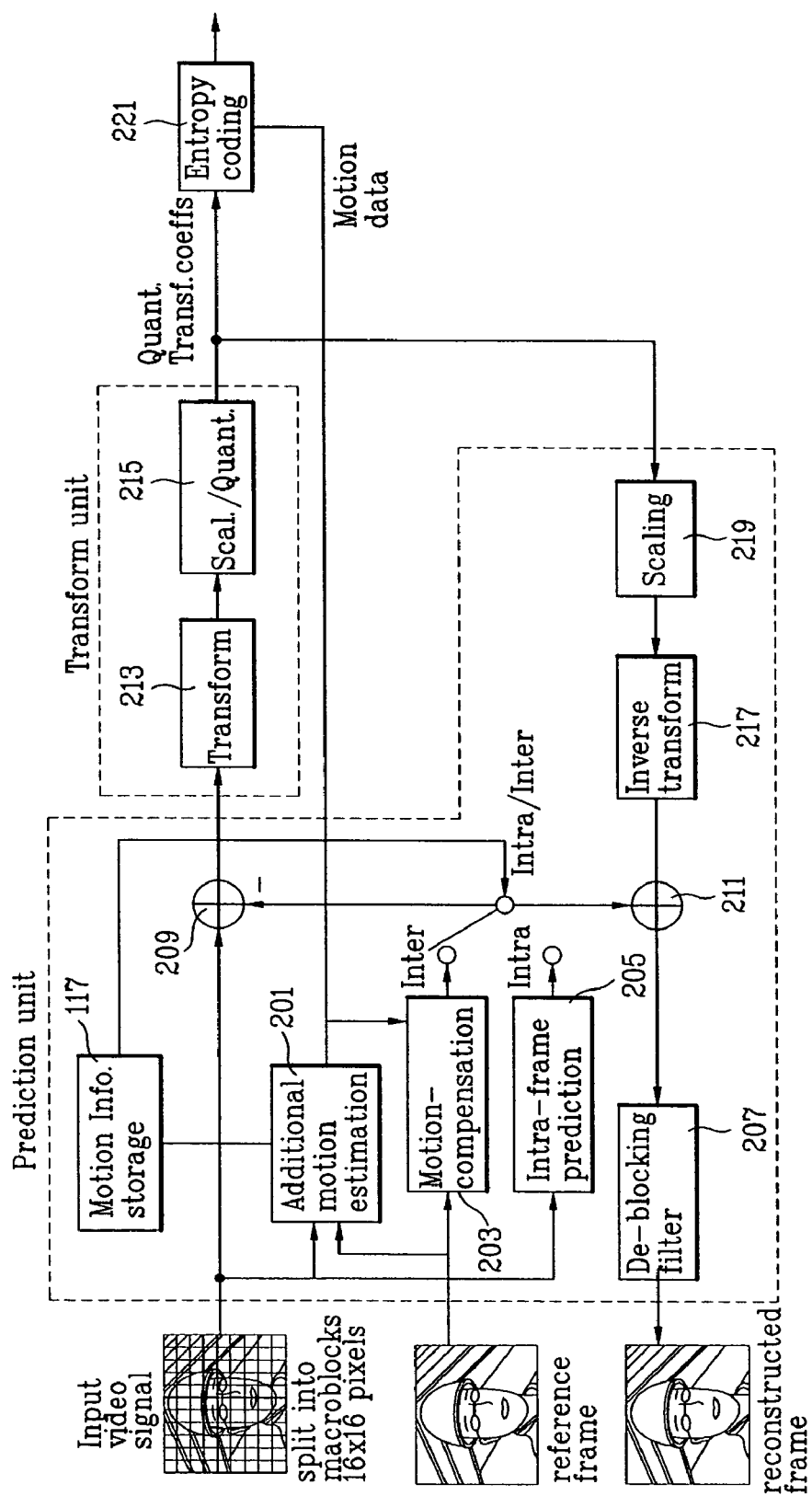
FIG. 3 is a block diagram illustrating a video encoder according to the present invention.

FIG. 3 is a block diagram illustrating an embodiment of a video encoder according to the present invention.

Referring to FIG. 3, the embodiment of the video encoder according to the present invention includes a prediction unit 200, a transform unit 220, and an entropy coding unit 221.

Operations of the above-mentioned video encoder according to the present invention will hereinafter be described with reference to FIG. 3.

The prediction unit 200 may perform inter-prediction and intra-prediction. The prediction unit 200 may use motion-associated information stored in the motion information storage unit 117 of FIG. 2.

The prediction unit 200 of FIG. 3 may further include an additional motion estimation unit 201. The additional motion estimation unit 201 receives a motion vector stored when the video decoder decodes the MPEG-2 format image, from the motion information storage unit 117, and encodes the input image using the motion vector.

The intra-frame prediction unit performs intra-prediction on a received macroblock when macroblock-type information received from the video decoder is indicative of the I-picture, and outputs the intra-prediction result of the received macroblock.

If the macroblock-type information received from the video decoder is the P-picture or the B-picture, the additional motion estimation unit 201 can estimate an additional motion vector of the motion vector received from the motion information storage unit 117.

The H.264 motion vector may be created at resolution higher than that of the MPEG-2 motion vector, such that it can more precisely perform motion estimation than the MPEG-2 motion vector. For example, the H.264 motion vector can perform motion estimation at an accuracy of ¼ pixel, whereas the MPEG-2 motion vector can perform motion estimation at an accuracy of ½ pixel. Therefore, the additional motion estimation unit 201 receives a motion vector from the motion information storage unit 117, and can estimate an additional motion vector associated with peripheral pixel values of the above-mentioned motion vector.

If the additional motion estimation unit 201 calculates an additional motion vector, it modifies the motion vector in accord with a difference between the motion vector received from the motion information storage unit 117 and the calculated motion vector, such that it can enhance compression efficiency of the video encoder.

If the video encoder according to an embodiment of the present invention does not include the above-mentioned additional motion estimation unit 201, the embodiment of th video encoder may control the motion compensation unit 203 to directly receive the motion vector from the motion information storage unit 117, such that the motion compensation unit 203 may perform motion compensation on the received motion vector.

Otherwise, if the additional motion estimation unit 201 creates an additional motion vector using peripheral pixels of the calculated pixel via which the motion vector is calculated, the motion compensation unit 201 can perform accurate motion compensation of the input picture using the above-mentioned additional motion vector.

The video encoder according to the embodiment of the present invention does not directly create the motion vector, and controls a video decoder capable of decoding the MPEG-2 format image to create the motion vector, such that it can perform motion compensation using a motion vector for each reference picture stored in the motion information storage unit 117. In other words, the video encoder according to the embodiment of the present invention equally uses information of each picture type (I, P, or B-picture) which has been used in the video decoder, and uses the pre-calculated motion vector, such that it reduces the number of calculations and increases calculation speed.

The adder 209 contained in the prediction unit 200 performs intra-prediction or inter-prediction of the input macroblock on the basis of a reference frame, and outputs the intra- or inter-prediction result to the transform unit 220.

The transform unit 220 transforms the result predicted by the prediction unit 200 using an orthogonal-basis function, and quantizes the above-mentioned transform result.

The entropy coding unit 221 encodes the above-mentioned quantized data, and outputs the H.264 bitstream on the basis of the encoded data.

Figure 4A:
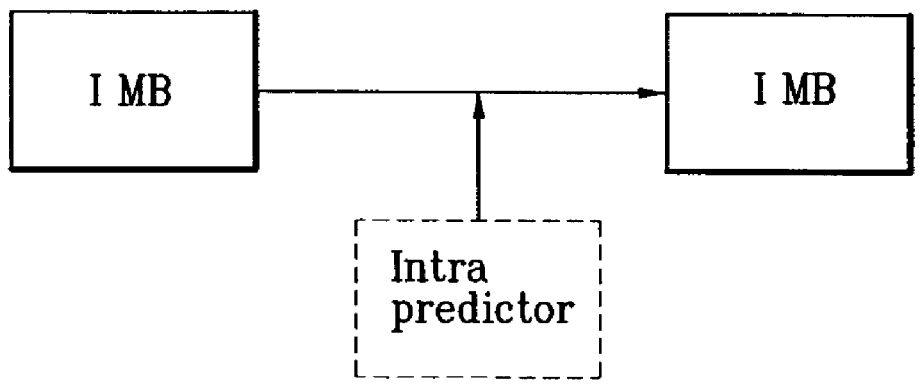
FIGS. 4A and 4B are conceptual diagrams illustrating a method for processing input macroblocks according to the present invention.
Figure 4B:
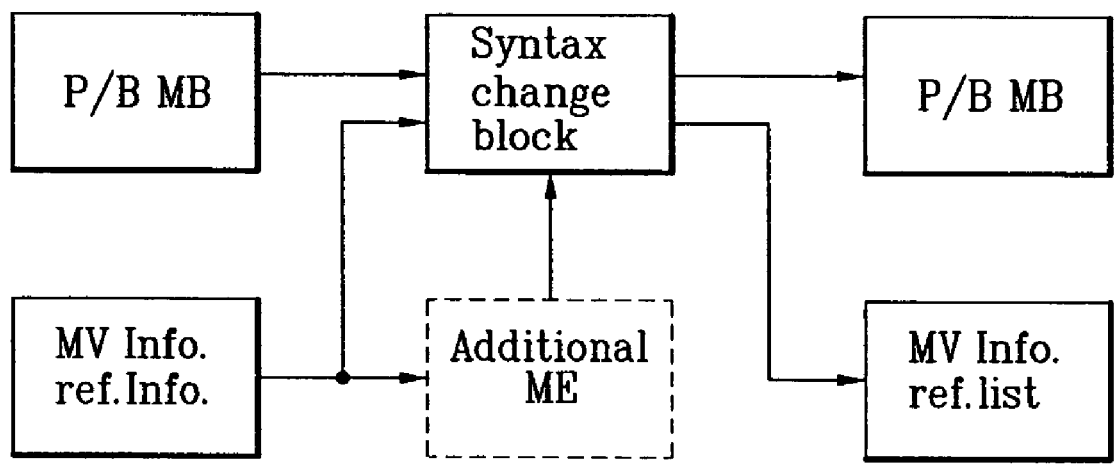

FIGS. 4A and 4B are conceptual diagrams illustrating a method for processing input macroblocks according to an embodiment of the present invention.

FIG. 4A is a conceptual diagram illustrating a method for allowing the video encoder to process an I-type macroblock according to the present invention. FIG. 4B is a conceptual diagram illustrating a method for processing a P-type macroblock or a B-type macroblock according to the present invention.

The video encoder according to the present invention may equally use individual picture types of the video decoder. Therefore, the I-picture of the video decoder can be matched with the I-picture of the video encoder, the P-picture of the video decoder can be matched with the P-picture of the video encoder, and the B-picture of the video decoder can be matched with the B-picture of the video encoder.

As can be seen from FIG. 4A, the intra-prediction for the I-type macroblock of the video encoder can be acquired by intra-predicting the I type macroblock of the video decoder.

When the video encoder performs the intra-prediction, a specific mode which has less errors, is selected from among a vertical mode, a horizontal mode, and a DC (Direct Current) mode, resulting in increased compression efficiency. In addition, the video encoder does not perform the intra-prediction on the I-picture received from the video decoder, such that the I-picture received from the video decoder may be used as the I-picture of the video encoder if required.

As can be seen from FIG. 4B, if the MPEG-2 macroblock received from the video decoder is determined to be the P-type or B-type macroblock, the video encoder can output the P/B-type macroblocks each having syntax changed according to the H.264 format using the motion vector received in the motion information storage unit.

Alternatively, the video encoder may calculate an additional motion vector using the received motion vector, and may perform additional motion estimation using the calculated additional motion vector.

The motion estimation method requires many more calculations than in the variable length coding method, the intra-prediction method, and the transformation method. Therefore, the video encoder according to the present invention may reduce the number of calculations, such that it may effectively encode necessary data.

Figure 5:
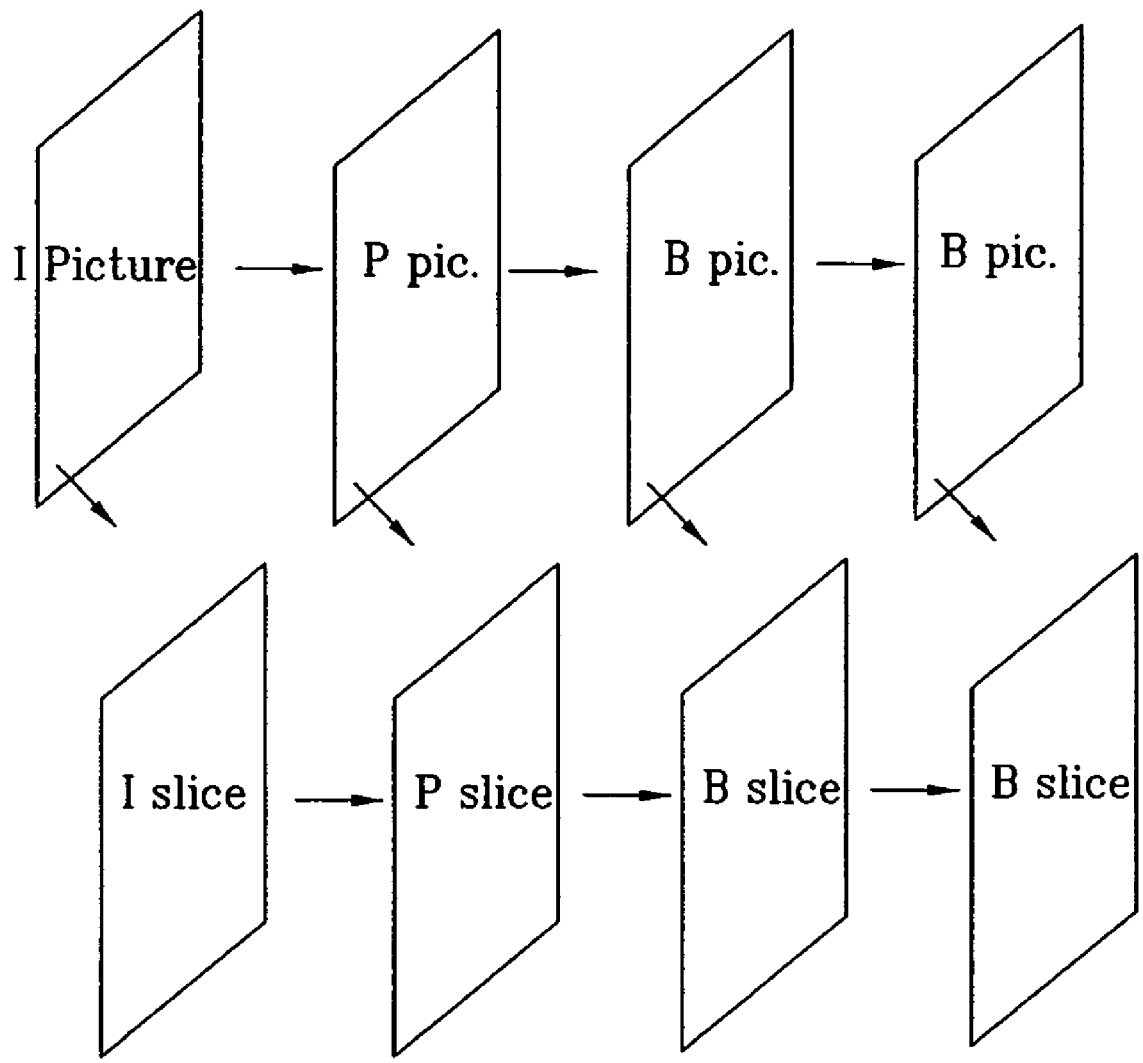
FIG. 5 exemplarily shows a GOP (Group Of Picture) encoding process for use in a video encoding method according to the present invention.

FIG. 5 exemplarily shows a GOP (Group Of Picture) encoding process for use in a video encoding method according to the present invention.

Referring to FIG. 5, if the video encoding method decodes the MPEG-2 format video data, and then encodes the decoded video data in the form of the H.264 format video data, a GOP-unit input image based on the MPEG-2 format can be mapped to a GOP-unit image based on the H.264 format.

Therefore, the I-type picture, the P-type picture, and the B-type picture based on the MPEG-2 format are mapped to an I-type slice, a P-type slice, and a B-type slice based on the H.264 format, respectively.

Therefore, as can be seen from FIG. 5, the video encoding method according to the present invention decodes video data into an I-picture, a P-picture, a B-picture, and a B-picture, and then encodes the decoded I-picture, the decoded P-picture, the decoded B-picture, and the decoded B-picture into an I-slice, a P-slice, a B-slice, and a B-slice, respectively.

In the case of encoding the I-picture and the P-picture, control information may be inserted into header information of each picture to perform a reference picture marking operation and a picture-out operation, such that output pictures can be re-aligned according to the H.264-based picture output rules.

Figure 6:
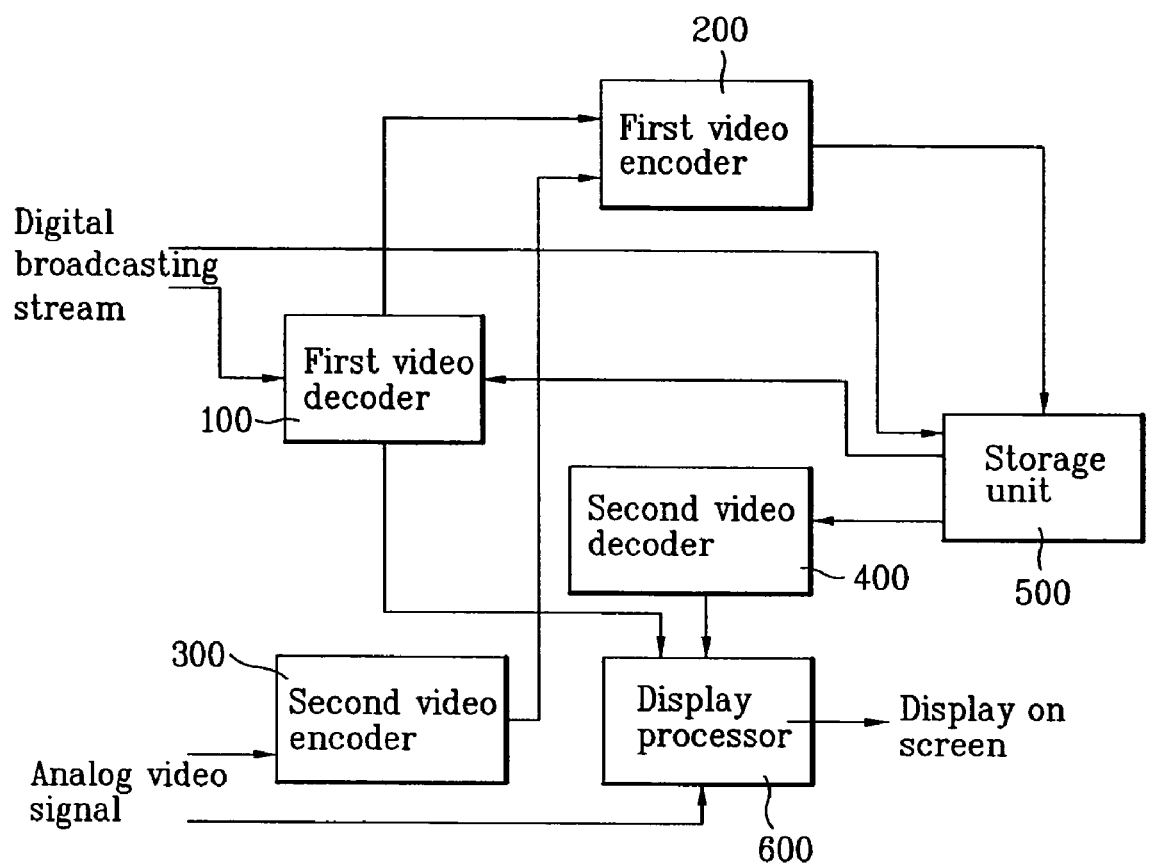
FIG. 6 is a block diagram illustrating a PVR according to the present invention.

FIG. 6 is a block diagram illustrating an embodiment of a PVR according to the present invention.

Operations the embodiment of the PVR according to the present invention will hereinafter be described with reference to FIG. 6.

Referring to FIG. 6, the PVR can receive an MPEG-2 based video signal and a NTSC-based analog video signal, and display a digital image using the received video signals. A first video decoder 100 decodes the received MPEG-2 based video signal, and outputs the decoded digital signal to a display processor 600. The display processor 600 may output the decoded digital video signal.

The first video decoder 10 may output the decoded MPEG-2 video signal to a first video encoder 200. The first video encoder 200 encodes the received MPEG-2 video signal into the H.264 video signal, and outputs the encoded video signal to a storage unit 500.

The first video decoder 100 may be operated in the same manner as in the preferred embodiment shown in FIG. 2. The first video encoder 200 may be operated in the same manner as in the preferred embodiment shown in FIG. 3. Therefore, the first video encoder 200 stores motion information of the MPEG-2 video signal generated from the first video decoder 100 in a motion information storage unit (not shown). The first video encoder 200 encodes the MPEG-2 video signal into the H.264 video signal using the stored motion information, and outputs the encoded H.264 video signal.

In the meantime, a second video encoder 300 encodes a received analog video signal into an MPEG-2 video signal, and outputs the encoded MPEG-2 video signal to the first video encoder 200.

In this case, an operation mode of the second video encoder 300 for encoding the MPEG-2 video signal and an operation mode of the first video encoder 200 for encoding the H.264 video signal are unified, such that the MPEG-2 specification can be compatible with the H.264 specification.

The storage unit 500 may directly store the MPEG-2 video signal which the PVR receives, or may store the H.264 video signal generated from the first video encoder 200.

The H.264 video signal stored in the storage unit 500 is decoded by the second video decoder 400, such that the display processor 600 may display the decoded video signal on a screen.

The display processor 600 may directly display the analog video signal other than the above-mentioned video signal on the screen if required.

As apparent from the above description, the video encoding method, the video encoder, and the PVR according to the present invention can effectively transcode the MPEG-2 format image into the H.264 format image, can display a desired image or video signal without deterioration of an image quality, and can quickly transform a compression format of the image into another format.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A video encoding method comprising the steps of:
    decoding an MPEG-2 video signal;
    storing reference picture information of a reference picture acquired from the MPEG-2 video signal and a motion vector of a macroblock associated with the reference picture when the reference picture is determined to be a P-picture or a B-picture; and
    encoding the decoded MPEG-2 video signal into an H.264 video signal using the stored reference picture information and the stored motion vector, wherein the encoding includes performing intra-prediction or inter-prediction on the decoded MPEG-2 video signal based on a picture type of the reference picture.

2. The method according to claim 1, wherein the reference picture information includes a picture number allocated to the reference picture.

3. The method according to claim 1, wherein if the decoded MPEG-2 video signal is a video signal associated with an Intra-picture, a Predictive-picture, or Bi-directional picture, the encoded H.264 video signal is a video signal associated with the I-picture, the P-picture, or the B-picture, respectively.

4. The method according to claim 1, wherein if the decoded MPEG-2 video signal is a video signal associated with the P-picture or the B-picture, an additional motion vector associated with the motion vector is calculated by using peripheral pixels of a pixel from which the motion vector is calculated, and is encoded into the H.264 video signal using the additional motion vector.

5. The method according to claim 1, wherein the reference picture information in the encoding step is encoded into a slice header of the H.264 format.

6. A video encoder comprising:
a prediction unit configured to perform intra-prediction on a received macroblock when a macroblock information type information received from a video decoder is indicative of an I-picture, to perform inter-prediction on the received macroblock when the macroblock information type information received from the video decoder is indicative of a P-picture or a B-picture, and to output a prediction resulting video signal, wherein the inter-prediction includes performing motion compensation of an input MPEG-2 video signal using reference picture information of a decoded MPEG-2 video signal and a motion vector of the reference picture;
a transform unit configured to transform the prediction resulting video signal received from the prediction unit using an orthogonal-basis function, and quantizing the transform-resultant value; and
an entropy coding unit configured to entropy-code a video signal received from the transform unit.

7. The video encoder according to claim 6, wherein the prediction unit outputs the MPEG-2 video signal associated the I-picture, the P-picture, or the B-picture into a H.264 video signal associated with the I-picture, the P-picture, or the B-picture.

8. The video encoder according to claim 6, wherein the prediction unit includes:
a motion information storage unit for storing the reference picture information and the motion vector of the reference picture; and
a motion compensation unit for performing motion compensation of the MPEG-2 video signal using the reference picture information and the motion vector.

9. The video encoder according to claim 8, wherein the prediction unit further includes:
an additional motion estimation unit for calculating an additional motion vector associated with the motion vector using peripheral pixels of a pixel from which the motion vector is calculated.

10. The video encoder according to claim 9, wherein the motion compensation unit performs motion compensation when the input MPEG-2 video signal is a video signal associated with the P-picture or the B-picture.

11. The video encoder according to claim 10, wherein the motion compensation unit performs motion compensation using the additional motion vector when the input MPEG-2 video signal is a video signal associated with the P-picture or the B-picture.

12. The video encoder according to claim 8, wherein the motion information storage unit stores the reference picture to which a picture number is allocated.

13. The video encoder according to claim 12, wherein the prediction unit, if the input MPEG-2 video signal is a video signal associated with the P-picture or the B-picture, transforms syntax of the video signal associated with the P- or B-picture into a H.264 format using the reference picture information, the motion vector of the reference picture, and an additional motion vector of the reference picture.

14. The video encoder according to claim 13, wherein the video signal associated with the P-picture or the B-picture is indicative of a macroblock.

15. A Personal Video Recorder (PVR) comprising:
a first video decoder configured to decode an input MPEG-2 video signal, calculating reference picture information of the MPEG-2 video signal and a motion vector of a reference picture, and outputting the calculated result;
a first video encoder configured to encode the decoded MPEG-2 video signal into a H.264 video signal using the motion vector and the reference picture information generated from the first video decoder, wherein the encoder includes a prediction unit for performing intra-prediction or inter-prediction on the decoded MPEG-2 video signal based on a picture type of the reference picture; and
a storage unit configured to store the H.264 video signal generated from the first video encoder.

16. The Personal Video recorder (PVR) according to claim 15, further comprising:
a display processor for allowing the video signal decoded by the first video decoder to be displayed on a screen.

17. The Personal Video recorder (PVR) according to claim 15, further comprising:
a second video encoder for converting the received analog image into a digital image; and
a second video decoder for decoding the H.264 video signal stored in the storage unit.

18. The Personal Video recorder (PVR) according to claim 17, further comprising:
a display processor for allowing the video signal decoded by the second video decoder to be displayed on a screen.

19. A video encoding method comprising the steps of:
decoding a first video signal;
storing reference picture information of a reference picture acquired from the first video signal and a motion vector of a macroblock associated with the reference picture when the reference picture is determined to be a P-picture or a B-picture; and
encoding the decoded first video signal into a second video signal using the stored reference picture information and the stored motion vector, wherein the encoding includes performing intra-prediction or inter-prediction on the decoded first video signal based on a picture type of the reference picture.

* * * * *